July 5, 1960
C. L. HAMM ET AL
2,943,873
COMPENSATED SEAL
Filed April 21, 1959
2 Sheets-Sheet 1
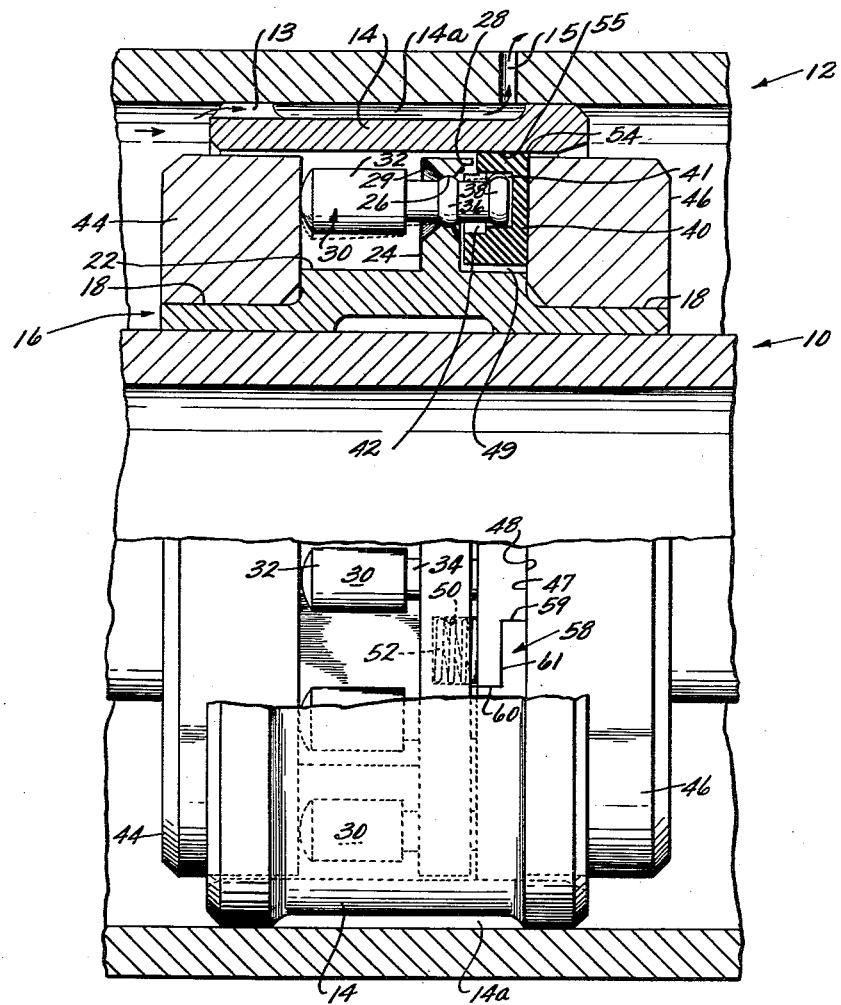
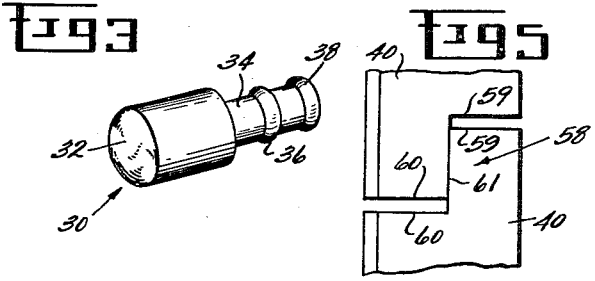
INVENTOR.
CLARENCE L. HAMM
WILLIAM WIDLANSKI
BY
Harry C. Burgess
ATTORNEY-

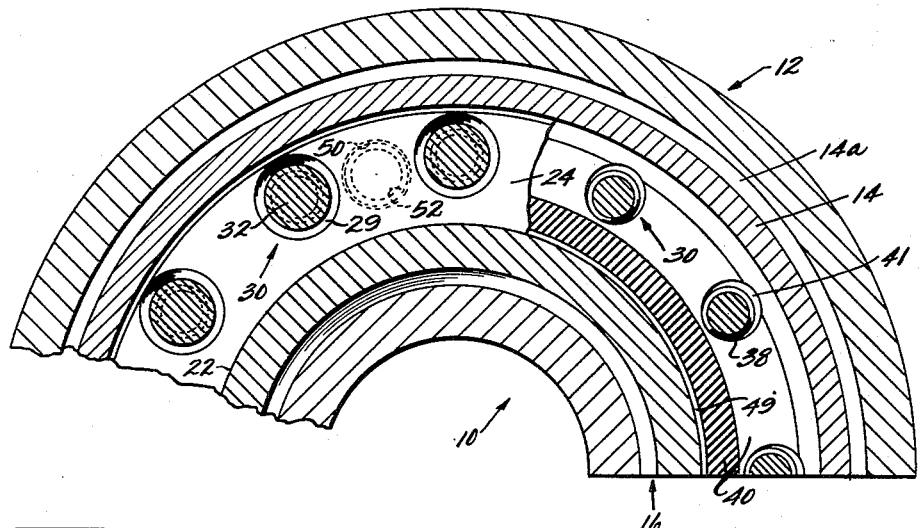
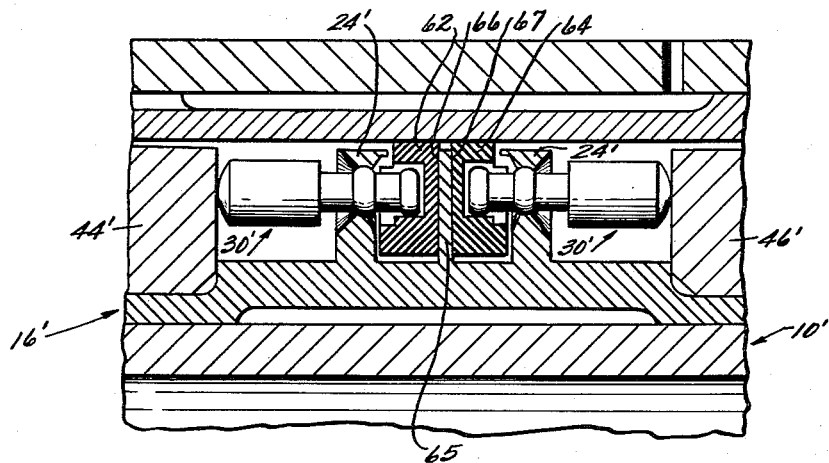

United States Patent Office 2,943,873
Patented July 5, 1960

2,943,873

COMPENSATED SEAL

Clarence Lockwood Hamm and William Widlansky, Marblehead, Mass., assignors to General Electric Company, a corporation of New York Filed Apr. 21, 1959, Ser. No. 807,790

7 Claims. (Cl. 286—11.11)

This invention relates to a seal for use on a shaft and, more particularly, to a seal having means compensating for centrifugal forces developed during rotation of the shaft at high speeds.

In certain types of machinery it is often desirable to employ two or more concentrically-rotatable shafts or a shaft rotating within a cylindrical housing. It also may be necessary to prevent shaft lubricating fluids from progressing axially along the shaft past a certain point. One means of accomplishing oil stoppage, for example, is to use an annular seal adapted to fit tightly over the shaft. A seal of this type may utilize a continuous sealing element constructed of a suitable oil resistant bearing material, the element being in slidable contact with the inside wall of an outer shaft or a housing.

When such a seal is used in equipment designed to operate over a wide range of speeds, the extreme centrifugal forces developed at the high end of the operational range can cause rapid wear or even seizure of the sealing element. This is largely a result of frictional heating caused by the high radial loads and the high peripheral speeds. If the sealing element is made undersize so as to provide just the right amount of sealing at high speeds, then at low speeds the sealing pressures may be too low to seal properly. Therefore, there is need for a seal which operates independently of speed, i.e., which is not adversely affected by the thermal effect of high speeds on the sealing element or the adjacent parts. Ideally, such a seal should include means for compensating for the centrifugal forces while, at the same time, supplying only the desired sealing pressures at all speeds. In addition, when the equipment is not operating, the seal should be capable of preventing gradual oil seepage past the sealing element.

Accordingly, it is an object of this invention to provide a seal for use with a shaft, the seal being centrifugally-compensated over a wide range of rotational speeds.

A further object is to provide a seal for use with concentrically rotatable shafts, or a shaft rotating within a cylindrical housing, the seal being self-compensating when subjected to the large centrifugal forces occurring during high speed operation of the shaft, and also providing the desired sealing pressures at all operating speeds and while the shaft is at rest.

Briefly, in one embodiment of our invention, we provide a centrifugally-compensated shaft seal for use between concentric shafts, or within a cylindrical housing, the seal having a transversely-split annular sealing element acted upon by a plurality of lever-arms supported by a seal frame in such a manner that as r.p.m. increases, or decreases, the peripheral sealing pressure exerted by the sealing element changes to compensate for the effect of centrifugal force on the element.

While the specification concludes with claims specifically pointing out and distinctly claiming the subject matter which we regard as our invention, it is believed that the invention will be better understood from the following description taken in connection with the accompanying drawings in which:

Figure 1 is an elevation of the seal, partially in section and,

Figure 2 is a cross-section of the seal, partially broken away to show the support for the lever-arms and, Figure 3 is a pictorial view of one embodiment of the lever-arms and, Figure 4 is a further embodiment of the seal including a double sealing element and, Figure 5 is an enlarged view of the stepped, transversely-extending cut in the annular sealing element.

While our device is equally useful for operation within a cylindrical housing, the seal is shown being utilized between a pair of concentrically rotatable shafts.

Referring now to the individual drawings, Fig. 1 shows a pair of hollow, concentric shafts such as might be found, for example, in a typical axial-flow turbo-machine. The inner shaft, which could carry a power take-off wheel, is indicated at 10, and the outer shaft, which might be used to drive a compressor, is indicated at 12.

With use of our novel seal some relieving means should be provided for lubricating oil moving axially of the turbo-machine. In the embodiment shown, the oil is directed through a plurality of holes 13 in a machined cylinder or "runner" 14 affixed to the inner circumference of the outer shaft. The "runner" is preferably recessed at 14a to save weight and to facilitate cooling. The recessed portion communicates with a plurality of oil outlet holes 15 in the wall of the outer shaft 12 for relieving the system.

Securely affixed to the outer circumference of the inner shaft 10 is a cylinder, indicated generally at 16, which serves as a base or frame for supporting the operating portions of the seal. The forward and aft faces of the frame 16 contain circumferentially-extending notches or seats 18—18. Disposed between these two axially-spaced seat portions of the frame is a central portion 22 which carries a rim portion 24. The rim portion, substantially larger in diameter than the other portions of the frame, contains a plurality of axially-extending holes 26, chamfered at 28 and 29. These holes are adapted to receive lever-arms capable of being centrifugally-acted as described below.

One embodiment of the lever-arms utilized to make the seal self-compensating is illustrated in Fig. 3. Shown therein is a cylindrical pin 30 having an enlarged end portion 32 and an axially-extending neck portion 34. Approximately midway of the neck portion is a raised portion 36, which may be semicircular in configuration, providing a fulcrum for the lever-pin when it is inserted in one of the frame rim holes 26. Preferably the hole diameter is such that there is single-point contact between the hole wall and the periphery of the fulcrum 36 in order to facilitate the pivoting movement. Where the fulcrum has the semicircular configuration of the embodiment shown, the holes 26 may be slightly recessed to prevent any significant axial movement of the lever-pins after they are snapped in place. At the end of the neck portion 34 is a second raised portion 38 forming a bearing surface for engagement with the sealing element described below.

Obviously, any suitable type of lever-arm could be substituted for the lever-pins 30. For example, a bar weighted at one end and having a neck adapted to be inserted in a hole 26 could be utilized. Means for pivoting the bar might include providing a cross-hole in the neck portion adapted to receive a pivot-pin suspended in the hole. Instead of a weighted end, a spring arrangement could be used to control the bar's reaction to centrifugal force.

In our device actual sealing is accomplished by use of a transversely-split, annular sealing element which, in the embodiment shown in the drawings, is in the form of an annular disk 40. The disk, constructed of any suitable oil resistant bearing material, such as carbon, is adapted to fit over the central portion 22 of the frame. The disk is positioned on the opposite side of the rim 24 from the enlarged end portions 32 of the lever-pins 30, i.e., immediately adjacent the bearing surfaces 38. The radially-extending disk face adjacent the rim is provided with a plurality of apertures 41 adapted to receive the bearing surfaces. The apertures extend only part way through the disk and are constructed so that the portion of each aperture immediately surrounding the inserted bearing surface is only slightly larger in diameter than the latter in order that very little pivoting motion is required by the levers to cause the surface to engage the aperture wall. Each aperture is enlarged at 42 to permit the necessary freedom of movement of the lever-pin neck 34.

To maintain the annular disk 40 in position on the central portion 22 of the frame and to prevent the lever pins 30 from slipping out of the holes 26, retaining means are provided. The retaining means shown in Fig. 1 consist of a pair of annular metal rings 44 and 46. The rings are adapted to fit over the edge portions 18—18 of the seal frame and may be held there by any suitable method, such as a force fit.

In the seal configuration shown in the drawings, the sealing action requires use of both peripheral and radially-extending surfaces of the annular sealing disk 40. The mating surfaces 47 and 48 of the sealing disk and the end ring 46, respectively, are machined to a close tolerance to provide a radially-extending sealing surface. This is necessary since the disk is annular and, but for the radial sealing action, oil could pass through the center of the disk, at 49, up along the "outer" face 47 of the disk, past the retaining ring 46, and thence axially along the inner shaft. To insure that this radial sealing action is continuous, a plurality of sockets 50 are provided in the radially-extending face of the rim 24 opposite the disk, preferably between each of the holes 26. However, the exact number of sockets is not critical. These sockets are adapted to receive springs 52 which extend sufficiently to contact the disk 40 to force it into continuous abutment with the ring 46.

When utilized, the "runner" 14 forms an axially-extending bearing surface for the annular sealing disk periphery, indicated at 54, for peripheral sealing action between the disk and a machined surface 55 on the "runner." Use of the runner is not absolutely essential, however, and any suitably machined bearing surface could be provided on the inner circumference of the outer shaft for cooperation with the sealing element.

As previously stated, an object of our invention is to provide a centrifugally-compensated shaft seal which will maintain the desired sealing pressure at all speeds and while the shaft is at rest. To insure sealing regardless of speed, the annular sealing disk 40 should be made slightly oversize in relation to the inside diameter of the outer shaft (or the "runner"). The disk is then transversely-split by means of a stepped cut, indicated generally at 58. By referring to the enlarged view of Fig. 5, it will be seen that the transversely-extending portions 59 and 60 of the stepped cut form slight gaps so as to enable the disk, which is slightly resilient, to be compressed to fit inside the shaft. The "stepped" configuration of the cut is designed to insure against oil leakage, i.e., the walls of the radially-extending portion 61 of the cut are in close, frictional contact, as opposed to the "gapped" transversely-extending portions.

It will be obvious from the above description that the slightly resilient disk 40 will tend to retain its original diameter under compression. Therefore, since the disk is slightly oversize it will abut the runner with just enough residual pressure to prevent oil from seeping through and beyond the disk under non-operating conditions. If the disk were not designed to be used at high operating speeds, and if there were no thermal expansion and contraction during operation, this would be all that would be necessary. However, under high speed operating conditions, the pressure of the disk periphery on the outer shaft tends to increase, primarily as a result of the large centrifugal forces accompanying such operation, and also due to the expansion caused by frictional heating. Without some means of compensating for this increase in pressure, the sealing element would wear very rapidly or even seize. By utilizing the centrifugal force generated in the seal during high speed operation of the shaft, the seal can be made self-compensating by reason of the lever-pin arrangement described above. In other words, as the centrifugal force increases, the enlarged ends 32 of the pins 30 will tend to move outwardly, since the pins are free to pivot about their fulcrums 36. This in turn pivots the smaller pin ends inwardly towards the shaft axis. These latter ends contain the bearing surfaces 38 which, since they will now be in contact with the walls of the apertures 41, act to oppose the centrifugal force tending to spread the gaps 59 and 60 and increase the relative disk diameter. Therefore, as speed increases, the levers act to close the disk gaps to maintain the disk at its original diameter. Since the pivoting motion of the levers will be a function of the centrifugal force, compensation is automatically adjusted to r.p.m. to give the desired sealing effect at all speeds. Thus, rapid wear or even seizure of the seal due to thermal expansion and high centrifugal forces is successfully avoided. Where the sealing element comprises a disk made of carbon or a like material, it may be desirable, although it is not absolutely necessary, to provide some means of reinforcement, such as a thin metal band imbedded in the disk.

Figure 4 illustrates a shaft seal having a double sealing element, the seal operating in the same manner as the above described single-element seal. The seal shown comprises a frame 16', a plurality of levers 30', a pair of end members 44' and 46' and a pair of annular sealing members 62 and 64. The sealing members are positioned on either side of a central retainer which may be in the form of a wall or partition 65 integral with the frame. The two sealing members cooperate with the partition to form radially-extending sealing surfaces 66 and 67. The rim portions 24'—24' are provided with a plurality of axially-extending sockets and coil springs which act to force the sealing members against the retaining partition.

It is our intention to cover all changes and modifications which do not depart from the scope of the invention and we do not wish to be taken as being limited to the exact embodiments discussed above and intend to claim a novel centrifugally-compensated shaft seal as follows:

1. A centrifugally-compensated annular seal comprising: cylindrical support means affixed to a shaft; a plurality of levers carried by said support means; at least one annular sealing element having peripheral and radially-extending sealing surfaces, said element being acted on by said levers which pivot under the influence of centrifugal force to reduce the effect of said force on the peripheral sealing pressure exerted by said element on a cylindrical member disposed concentrically to said shaft; means carried by the support means to retain said levers and said element in position on said support means; and means to force a radially-extending sealing surface of said element into abutment with said retaining means.

2. A centrifugally-compensated annular seal comprising: a cylindrical seal frame, said frame being affixed to a shaft; a plurality of axially-extending levers, said levers being pivotally supported by said frame; a transversely-split resilient sealing element, said element being in continuous slidable abutment with the inside wall of a cylindrical member disposed concentrically to said shaft; means on said sealing element for engaging one end of each of said levers; retaining means for securing said levers and said sealing element on said frame; and means to maintain said sealing element in abutment with said retaining means, said levers being so constructed and arranged that said engaged lever ends will move radially inward towards the shaft axis in proportion to the speed of rotation of the shaft to reduce the effect of centrifugal force on the peripheral sealing pressure exerted by said sealing element.

3. For use with concentrically-rotatable shafts, a centrifugally-compensated seal comprising: a plurality of axially-extending, circumferentially-spaced levers, said levers having enlarged end portions and elongated neck portions, each neck portion including a raised pivot surface and a raised bearing surface, the latter surface being disposed at the opposite end of said neck from said enlarged end; a transversely-split resilient sealing element, said element being in continuous slidable abutment with the inside wall of an outer shaft; means on said sealing element for engaging the bearing surfaces of said neck portions; a cylindrical frame, said frame being affixed to an inner shaft and having means to pivotally support said levers about said pivot surfaces; retaining means for securing said levers and said sealing element on said frame, at least a portion of which retaining means being in abutment with said sealing element, said levers being so constructed and arranged that said engaged lever ends will move radially inward towards the shaft axis in proportion to the speed of rotation of the inner shaft to reduce the effect of centrifugal force on the peripheral sealing pressure exerted by said sealing element on the inside wall of said outer shaft.

4. For use with concentrically-rotatable shafts, a centrifugally-compensated seal comprising: a cylindrical frame, said frame being affixed to an inner shaft and having axially-spaced edge portions and a centrally-located rim portion, said rim portion including a plurality of axially-extending holes; a plurality of axially-extending levers, said levers being pivotally supported in said rim holes; an annular transversely-split resilient sealing element, said element being in continuous slidable abutment with the inside wall of an outer shaft; means carried by said sealing element for engagement with one end of each of said levers; retainers for securing said levers and said sealing element on said frame, said retainers being positioned on said frame edge portions with at least one retainer being in continuous slidable abutment with said sealing element, said levers being so constructed and arranged that said engaged lever ends will move radially inward towards the shaft axis in proportion to the speed of rotation of the inner shaft to reduce the effect of centrifugal force on the peripheral sealing pressure exerted by said sealing element on the inside wall of said outer shaft.

5. For use with concentrically-rotatable shafts of substantially unequal diameters, a centrifugally-compensated intershaft seal comprising: a cylindrical frame affixed to an inner shaft and having a centrally-located rim portion; a transversely-cut annular disk, said disk being positioned on said frame adjacent said rim portion and having its periphery in continuous slidable contact with the inside wall of an outer shaft for sealing of the space between said inner and outer shafts to the passage of fluid; a plurality of axially-extending levers having raised bearing surfaces at one end thereof, said levers being supported by the rim portion of said frame; a plurality of apertures in one of the radial faces of said annular disk for receiving said lever bearing surfaces for relative movement therein; a pair of rings carried by the frame for securing said levers and said disk on said frame; a plurality of spring members carried by said frame, said spring members maintaining the other radial face of said annular disk in continuous abutment with one of said rings, said levers being so constructed and arranged that the bearing surfaces of said levers will move radially inward towards the shaft axis in proportion to the speed of rotation of the inner shaft to reduce the effect of centrifugal force on the peripheral sealing pressure exerted by said disk on the inside wall of said outer shaft.

6. In combination with concentrically-rotatable shafts of substantially unequal diameters, an intershaft seal comprising: a plurality of axially-extending, lever-pins, said pins having an enlarged portion at one end thereof, an elongated neck portion extending axially from said enlarged end, a raised pivot surface positioned centrally of said neck, and a bearing surface at the other end of said neck from said enlarged end; an annular, transversely-cut disk, the periphery of which is in continuous slidable abutment with the inside wall of the outer shaft for sealing of the space between said shaft and the inner shaft to the passage of fluid; a plurality of apertures in one of the radial faces of said disk adapted to receive the bearing surfaces of said pins for relative movement therein; supporting means for said disk and said pins affixed to said inner shaft; retaining members adapted for engagement with said supporting means, said retaining members securing said pins and said annular disk therebetween; a plurality of spring members carried by said supporting means for maintaining said disk in abutment with one of said retaining members, said seal being so constructed and arranged that the enlarged end portions of said pins will move radially outward under the influence of centrifugal force to pivot the pins and cause said other pin ends to move radially inward in proportion to the speed of rotation of the inner shaft to reduce the effect of said force on the peripheral sealing pressure exerted by said disk on the inside wall of said outer shaft.

7. A centrifugally-compensated annular seal comprising: a cylindrical seal frame affixed to a shaft, said frame having a centrally-located, circumferentially-extending partition; a plurality of axially-extending levers, said levers being pivotally supported by said frame; a pair of annular sealing elements positioned on said frame on either side of said partition, said elements having their peripheries in continuous abutment with the inside wall of a cylindrical member disposed concentrically to said shaft; means on each of said sealing elements adapted for engagement with one end of each of said levers; annular means for securing said levers and said sealing elements on said frame; and spring members carried by the frame for maintaining the sealing elements in continuous abutment with said partition, said levers being so constructed and arranged that said engaged lever ends will move radially inward towards the shaft axis in proportion to the speed of rotation of the shaft to reduce the effect of centrifugal force on the peripheral sealing pressures exerted by said elements.

No references cited.